(12) United States Patent
Muhlestein et al.

(10) Patent No.: US 7,627,865 B2
(45) Date of Patent: Dec. 1, 2009

(54) METHOD AND APPARATUS FOR ACCESSING INSTRUMENTATION DATA FROM WITHIN A MANAGED CODE ENVIRONMENT

(75) Inventors: Travis J. Muhlestein, Redmond, WA (US); Corina E. Feuerstein, Redmond, WA (US); Justin Grant, Seattle, WA (US); Markus Horstmann, Redmond, WA (US); Radu Rares Palanca, Redmond, WA (US); Alan G. Boshier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 247 days.

(21) Appl. No.: 09/900,060

(22) Filed: Jul. 6, 2001

(65) Prior Publication Data
US 2002/0108102 A1  Aug. 8, 2002

Related U.S. Application Data

(60) Provisional application No. 60/217,123, filed on Jul. 10, 2000.

(51) Int. Cl.
*G06F 9/44* (2006.01)

(52) U.S. Cl. ................................................. 717/165

(58) Field of Classification Search ......... 717/108–114, 717/124–128, 165; 707/10, 102; 719/315–316, 719/328–330; 709/223; 702/121
See application file for complete search history.

(56) References Cited

U.S. PATENT DOCUMENTS

| | | | | |
|---|---|---|---|---|
| 5,097,533 A | * | 3/1992 | Burger et al. | ............... 719/328 |
| 5,732,270 A | * | 3/1998 | Foody et al. | ................ 719/316 |
| 6,085,030 A | * | 7/2000 | Whitehead et al. | .......... 709/203 |
| 6,119,130 A | | 9/2000 | Nguyen | |
| 6,226,792 B1 | | 5/2001 | Goiffon | |
| 6,262,587 B1 | | 7/2001 | Whetsel | |
| 6,324,683 B1 | * | 11/2001 | Fuh et al. | .................... 717/124 |
| 6,347,342 B1 | * | 2/2002 | Marcos et al. | .............. 719/315 |
| 6,496,833 B1 | * | 12/2002 | Goldberg et al. | ............ 707/102 |
| 6,615,253 B1 | * | 9/2003 | Bowman-Amuah | ......... 709/219 |
| 6,701,514 B1 | * | 3/2004 | Haswell et al. | .............. 717/115 |
| 6,721,941 B1 | | 4/2004 | Morshed | |
| 6,754,664 B1 | | 6/2004 | Bush | |

(Continued)

OTHER PUBLICATIONS

Microsoft Corporation, "Microsoft Windows Management Instrumentation Scripting", Apr. 1999, pp. 1-15.*

(Continued)

*Primary Examiner*—Tuan Anh Vu
(74) *Attorney, Agent, or Firm*—Workman Nydegger

(57) ABSTRACT

An instrumentation client API is provided within a managed code runtime environment for accessing instrumentation data that resides outside of the managed code runtime environment. The instrumentation client API provides access to instrumentation data in a manner that is consistent with the classes and models provided by the runtime environment, raises exceptions in a manner that is compatible with the runtime environment, and is secure. The instrumentation client API wraps, or translates, calls to and from an instrumentation data source external to the runtime environment. The API interacts with an interface provided by the instrumentation data source to provide functionality and connectivity that is not otherwise provided by the instrumentation data source. The API also provides access to instrumentation data in a manner that is consistent with the models and classes provided by the runtime platform. The classes defined by the API return collections and exceptions in a way that is consistent with the managed code runtime platform.

14 Claims, 9 Drawing Sheets

U.S. PATENT DOCUMENTS

| | | | |
|---|---|---|---|
| 6,871,346 | B1 | 3/2005 | Kumbalimutt |
| 2002/0019971 | A1 | 2/2002 | Zygmont |
| 2003/0154172 | A1* | 8/2003 | Guyan et al. .................. 705/80 |
| 2005/0055322 | A1* | 3/2005 | Masters et al. ................. 707/1 |
| 2005/0055350 | A1* | 3/2005 | Werme et al. ................. 707/10 |

OTHER PUBLICATIONS

Festor, O., et al., "Integration of WBEM-Based Management Agents in the OSI Framework," Integrated Network Management VI, Distributed Management for the Networked Millennium, Proceedings of the Sixth IFIP/IEEE International Symposium on Integrated Network Management, 1999, pp. 49-64.

Hariri, S., et al., "Design and Analysis of a Proactive Application Management System (PAMS)," Proceedings of Network Operations and Management Symposium 'The Networked Planet: Management Beyond 2000', 2000, pp. 89-101.

John, A., et al., "XNAMI—An eXtensible XML-Based Paradigm for Network and Application Management Instrumentation," IEEE International Conference on Networks, ICON '99 Proceedings, 1999, pp. 115-124.

Johnson, L.J., "Manage Resources With WMI: Learn how to Manage Computer Resources on all Windows Platforms with WMI.," Visual Basic Programmers' Journal, vol. 10, No. 8, Jul. 2000, pp. 44-53.

Kar, G., et al., "Managing Application Services over Service Provider Networks: Architecture and Dependency Analysis," Proceedings of Network Operations and Management Symposium 'The Networked Planet: Management Beyond 2000', 2000, pp. 61-74.

Katchabaw, M.J., et al., "Making Distributed Applications Manageable Through Instrumentation," The Journal of Systems and Software, vol. 45, No. 2, Mar. 1, 1999, pp. 81-97.

Kawamura, R., et al., "A Middleware Architecture for Active Distributed Management of IP Networks," Proceedings of Network Operations and Management Symposium 'The Networked Planet: Management Beyond 2000', 2000, pp. 291-304.

McConnell, J., "DMTF: A Foundation for Systems Management?", ConneXions, vol. 8, No. 9, Sep. 1994, pp. 22-27.

Ohara, Y., et al., "Management and Communication Protocol Specifications," NTT Research and Development Journal, vol. 44, No. 11, 1995, pp. 1089-1098.

Vidal, M.E., et al., "A Meta-Wrapper for Scaling up to Multiple Autonomous Distributed Information Sources," Proceedings, Third IFCIS International Conference on Cooperative Information Systems, 1998, pp. 148-157.

Yamagishi, K., et al., "An Implementation of a TMN-Based SDH Management System in Japan," IEEE Communications Magazine, vol. 33, No. 3, Mar. 1995, pp. 80-85.

Thompson, J.P. "Web-Based Enterprise Management Architecture," IEEE Communications Magazine, vol. 36, No. 3, Mar. 1998, pp. 80-86.

\* cited by examiner

METHOD AND APPARATUS FOR ACCESSING INSTRUMENTATION DATA FROM WITHIN A MANAGED CODE ENVIRONMENT

CROSS-REFERENCE TO RELATED APPLICATION

This application claims the benefit of U.S. Provisional Application No. 60/217,123, filed Jul. 10, 2000, which is expressly incorporated herein by reference.

FIELD OF THE INVENTION

This invention generally relates to the field of computer systems management and, more specifically, relates to a method and apparatus for providing access to computer systems management instrumentation data from within a managed code runtime environment.

BACKGROUND OF THE INVENTION

A wide array of products and services are accessible through the Internet and the World Wide Web ("Web" or "WWW"). For example, a Web user can shop, get traffic conditions, read product reviews, and compare products online. However, there are many types of services that are still not available through the Web. While a Web user may be able to find a restaurant in their particular area, for instance, they may be unable to determine whether that restaurant has seating available at a particular time on a particular night. Likewise, if a user owns a business, they may be interested in knowing if a vendor has a particular item in stock. If more than one vendor has the item in stock, the business owner may be interested in knowing which vendor has the item for the lowest price and which one can deliver the item fastest. Users are unable to perform such tasks using services currently available on the Web.

Services like those described above do not yet exist because there are no standards in place for integrating proprietary information like available restaurant seating, vendor inventory, prices, and delivery times, and other such information. After all, each vendor most likely has a unique way of describing the items or products they sell. Moreover, it is very difficult to develop computer program code necessary for integrating such disparate data and services. However, emerging technologies, such as the extensible markup language ("XML"), make the task of describing disparate types of data in a consistent way much easier. Moreover, new application development and execution platforms can help developers create and deploy distributed applications quicker and easier than ever before.

One development and execution platform that helps software developers to create and deploy distributed applications is the Microsoft® .NET platform from Microsoft® Corporation of Redmond, Wash. The Microsoft® .NET platform is an application programming and execution platform that provides write-once, compile-once, run-anywhere application development. Microsoft® .NET platform applications may be created in any language as long as they are compiled by a compiler that targets the Microsoft® .NET universal runtime ("URT"), also known as the common language runtime engine. Such a compiler compiles .NET applications into intermediate language ("IL"), rather than directly into executable code. IL is an intermediate language that is platform-independent and CPU-independent. IL is a much higher level language than most CPU machine languages.

To execute a .NET platform application, the compiled IL is interpreted, or "just-in-time" compiled, by the URT into native machine instructions. The native machine instructions can then be directly executed by the CPU. Because IL is CPU-independent, IL can execute on any CPU platform as long as the operating system running on that CPU platform hosts the Microsoft® .NET URT. Applications compiled into IL need the URT to execute, and are called "managed code" applications. By contrast, code that does not need the common language runtime to execute, such as today's Win32 applications, are called "native code" applications.

The Microsoft® .NET platform also includes a base library that comprises a large set of class libraries and services. These libraries and services provide access to the features of the URT, and other high-level services, so that software developers do not have to code the same services repeatedly. For instance, classes may be offered to expose hypertext transfer protocol ("HTTP") clients and servers, generic containers like arrays and dictionaries, and other types of classes previously available only through language-specific extensions.

The Microsoft® .NET platform also provides technologies to support rapid software development. For instance, in the Microsoft® .NET platform, all application services are offered via a common object-oriented programming model. This is unlike previous development and execution environments where some operating system facilities are accessed via dynamically linked library ("DLL") functions and other facilities are accessed via component object model ("COM") objects. Moreover, the Microsoft® .NET platform provides consistency in error-handling. When programming Microsoft® Windows® in a traditional fashion, some functions report Win32 error codes, some return HRESULTS, and some raise exceptions. In the Microsoft® .NET platform, all errors are reported via exceptions. This greatly simplifies reading, writing, and maintaining code.

In order to access management information about other applications and devices, Microsoft® .NET applications need access to instrumentation data, such as the data provided by Microsoft® Windows Management Instrumentation ("WMI"). WMI is the Microsoft® Corporation's implementation of the Distributed Management Task Force's ("DMTF") Web-Based Enterprise Management ("WBEM") initiative. WMI is a set of system services and programming interfaces that allow applications to expose instrumentation data in a consistent way. By exposing instrumentation data in a consistent fashion, management applications can be written to a single application programming interface ("API"). WMI also provides a set of services, such as remoting, asynchronous access, and scripting, that allow applications and management tools to better access and serve management data without requiring information providers to explicitly support those features. Additionally, WMI services also include a standard query language for management objects, event publication and subscription, and standard event filtering and aggregation.

WMI currently runs in native code outside the .NET platform. Managed code applications executing within the .NET platform can access WMI data provided by applications executing in native code. However, the methods for accessing WMI data from within the managed code environment are difficult to implement and utilize. Because WMI is a management platform, in order to be effective its facilities must be easily available to all executing applications, including both .NET applications executing within the managed code environment or native code applications executing outside the .NET platform. Moreover, applications executing within the .NET platform should be able to access WMI data in a manner that is consistent with the programming model of the development and execution environment.

Therefore, in light of the above, there is a need for a method and system for providing applications executing within a managed code environment, such as the .NET platform, easy access to instrumentation data that resides outside the managed code runtime. Moreover, there is a need for a method and apparatus for providing access to instrumentation data that can provide access to instrumentation data from within the managed code environment in a manner that is consistent with the models and classes provided by the managed code environment.

SUMMARY OF THE INVENTION

The present invention solves the above-described problems by providing an instrumentation client API within a managed code runtime environment for providing access to instrumentation data. The instrumentation client API provides access to instrumentation data in a manner that is consistent with the classes and models provided by the runtime environment, raises exceptions in a manner that is compatible with the runtime environment, and is secure.

Generally described, the present invention provides an instrumentation client API that is exposed within a runtime computing environment that wraps, or translates, calls to and from an instrumentation data source external to the runtime environment. The API interacts with an instrumentation data source to provide access to instrumentation data that is not otherwise available within the managed code environment. Moreover, the API provides access to instrumentation data in a manner that is consistent with the models and classes provided by the managed code environment. For instance, the classes defined by the API return collections and exceptions in a way that is consistent with the managed code runtime platform.

More specifically described, the present invention provides an API within a runtime code execution environment that exposes a number of classes for accessing instrumentation data that resides within and outside the runtime environment. For instance, a management object class is provided within the runtime environment for representing instances of instrumentation data. An instance of the management object class encapsulates a single non-transient instrumentation data object. Instances of instrumentation objects are represented using this class, while instrumentation classes are represented using a management class subclass.

In order to construct an instance of the management object class, three pieces of information are necessary: the path of the instrumentation data object to bind to, options used to retrieve the instrumentation object, and a scope identifying the parent of the instrumentation object. Once this information has been provided, a Get( ) method may be called to bind an instance of the management object class to the corresponding instrumentation object. If the operation is unsuccessful, an instance of a management exception class will be returned. The management exception class throws exceptions compatible with the managed code runtime environment based upon error conditions returned from the instrumentation data source.

Once an instance of the management object class has been successfully constructed, the object provides access to the methods, qualifiers, and properties of the object in a manner that is easy to use and consistent with the managed code runtime environment. For instance, the management object encapsulates a number of methods that may be performed directly on the object itself, such as a Get( ) method for binding the instance of the management object class to the instrumentation object, a Put( ) method for saving changes made to the object or creating a new instrumentation object, a CopyTo( ) method for copying the object to another scope, and a Delete( ) method for deleting the object. Moreover, an InvokeMethod( ) method is encapsulated for invoking a method provided by the management instrumentation data source, such as a method provided by WMI, directly upon the object.

According to an embodiment of the present invention, the management object class also encapsulates methods for retrieving related objects that may be called directly on a management object. For instance, a GetRelated( ) method is provided that offers functionality for retrieving a collection of objects related to the instance the management object class upon which it is called. A GetRelationships( ) method is also provided that offers functionality for retrieving a collection of objects that refer to the instance of the management object class upon which it is called. The collections of objects returned by these methods are compatible with the data types utilized in the managed code runtime environment.

The present invention also allows easy access to the properties of an instance of the management object class using an indexer. Using the indexer, properties of a management object may be retrieved from the object itself in an array-like fashion. Direct retrieval of the properties of a management object in this way is consistent with the object-oriented programming paradigm of the managed code runtime environment and eliminates the need to call a method to retrieve properties of a management object.

According to an embodiment of the present invention, a management object searcher class is also provided to permit the retrieval of a collection of instrumentation objects based on a specified query. A management options object may also be utilized to specify options for the search. A management event watcher class is further provided that incorporates functionality for subscribing to temporary event notifications from the management instrumentation data source. A management operation watcher class is also provided for raising events concerning operations on other classes. Each of these classes are implemented in a manner that is consistent with the managed code runtime in which they execute, allow access to methods, properties, and qualifiers in a similarly consistent manner, and throw exceptions in a manner that is also consistent with the managed code runtime environment.

The present invention also provides a system, computer-controlled apparatus, and a computer-readable medium for providing access to an management instrumentation data source from within a managed code environment.

BRIEF DESCRIPTION OF THE DRAWINGS

The foregoing aspects and many of the attendant advantages of this invention will become more readily appreciated [as the same becomes better understood] by reference to the following detailed description, when taken in conjunction with the accompanying drawings, wherein.

DETAILED DESCRIPTION OF THE INVENTION

The present invention is directed to a method and apparatus for providing access to instrumentation data from within a managed code runtime environment. Aspects of the present invention may be embodied in an instrumentation client API exposed within a managed code runtime environment. Additionally, aspects of the present invention may be embodied in an operating system program, such as Windows® 2000, provided by Microsoft Corporation of Redmond, Wash.

Referring now to the figures, in which like numerals represent like elements, an actual embodiment of the present invention will be described. Although aspects of the invention will be described in the general context of an API that includes program modules that execute on an operating system in conjunction with a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. Although the invention is also described as being practiced in a distributed computing environment, where tasks are performed by remote processing devices that are linked through a communications network, other possible implementations should be apparent to those skilled in the art.

Figure 1:
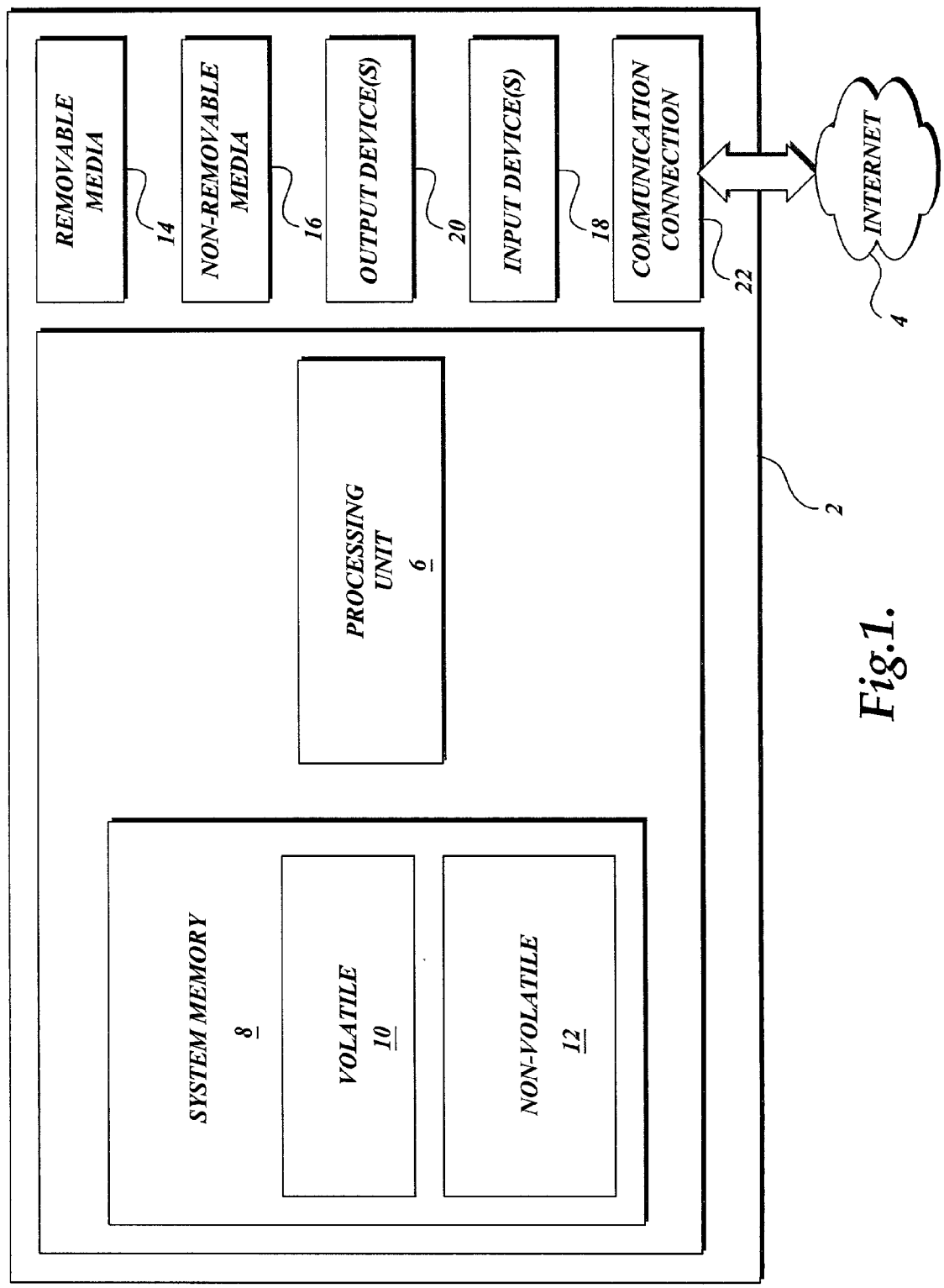
FIG. 1 is a block diagram showing a computer that is an illustrative operating environment for an actual embodiment of the present invention.

Referring now to FIG. 1, an illustrative operating environment for an embodiment of the present invention will be described. Aspects of the present invention are implemented as an executable software component executing on a computer, such as the computer 2, accessible via a distributed computing network, such as the Internet 4. As is well known to those skilled in the art, the Internet 4 comprises a collection of networks and routers that use the Transmission Control Protocol/Internet Protocol ("TCP/IP") to communicate with one another. The Internet 4 typically includes a plurality of local area networks ("LANs") and wide area networks ("WANs") that are interconnected by routers. Routers are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers, such as the computer 2, and other related electronic devices can be remotely connected to either the LANs or the WANs via a permanent network connection or via a modem and temporary telephone link. It will be appreciated that the Internet 4 comprises a vast number of such interconnected networks, computers, and routers.

The computer 2 comprises a general purpose computer as known to those skilled in the art, including a processing unit 6, a system memory 8, and a system bus (not shown) that couples the system memory 8 to the processing unit 6. The computer 2 also typically includes at least some form of computer-readable media. Computer-readable media can be any available media that can be accessed by the computer 2. By way of example, and not limitation, computer-readable media may comprise computer storage media and communication media. Computer storage media includes volatile media 10 and nonvolatile media 12, removable 14 and non-removable media 16 implemented in any method or technology for storage of information such as computer readable instructions, data structures, program modules or other data. Computer storage media includes, but is not limited to, RAM, ROM, EPROM, EEPROM, flash memory or other solid-state memory technology, CD-ROM, digital versatile disks ("DVD") or other optical storage, magnetic cassettes, magnetic tape, magnetic disk storage or other magnetic storage devices, or any other medium which can be used to store the desired information and which can be accessed by the computer 2.

As known to those skilled in the art, the system memory 8 may include a ROM and a RAM (not shown). A basic input/output system ("BIOS"), containing the basic routines that help to transfer information between elements within the computer 2, such as during start-up, may also be provided. A number of program modules may be stored in the computer storage media, including an operating system suitable for controlling the operation of the computer 2, such as Windows NT® or Windows® 2000 from Microsoft®. As will be described in more detail below, the system memory 8 may also store a managed code environment, including a common language runtime, and an instrumentation client API for providing access to instrumentation data available outside the managed code environment.

A user may control the operation of the computer 2 through input devices 18 such as a keyboard or a mouse (not shown). These and other input devices are often connected to the processing unit 6 through a serial port interface (not shown) that is coupled to the system bus, but may be connected by other interfaces, such as a universal serial bus ("USB"). Output devices 20, such as a monitor (not shown), are also connected to the system bus via an interface, such as a video adapter (not shown). In addition to the monitor, the computer 2 may include other output devices 20, such as a printer (not shown).

As described briefly above, the computer 2 operates in a networked environment in the actual embodiment of the invention described herein. The computer 2 communicates with other computers over the Internet 4 and connects to the Internet 4 through a network interface. Alternatively, the computer 2 may include a modem (not shown) and use an Internet Service Provider ("ISP") to establish a connection to the Internet 4. It will be appreciated that the network connections described herein are illustrative and other means of establishing a communications link between the computer 2 and the Internet 4 may be used.

Figure 2:
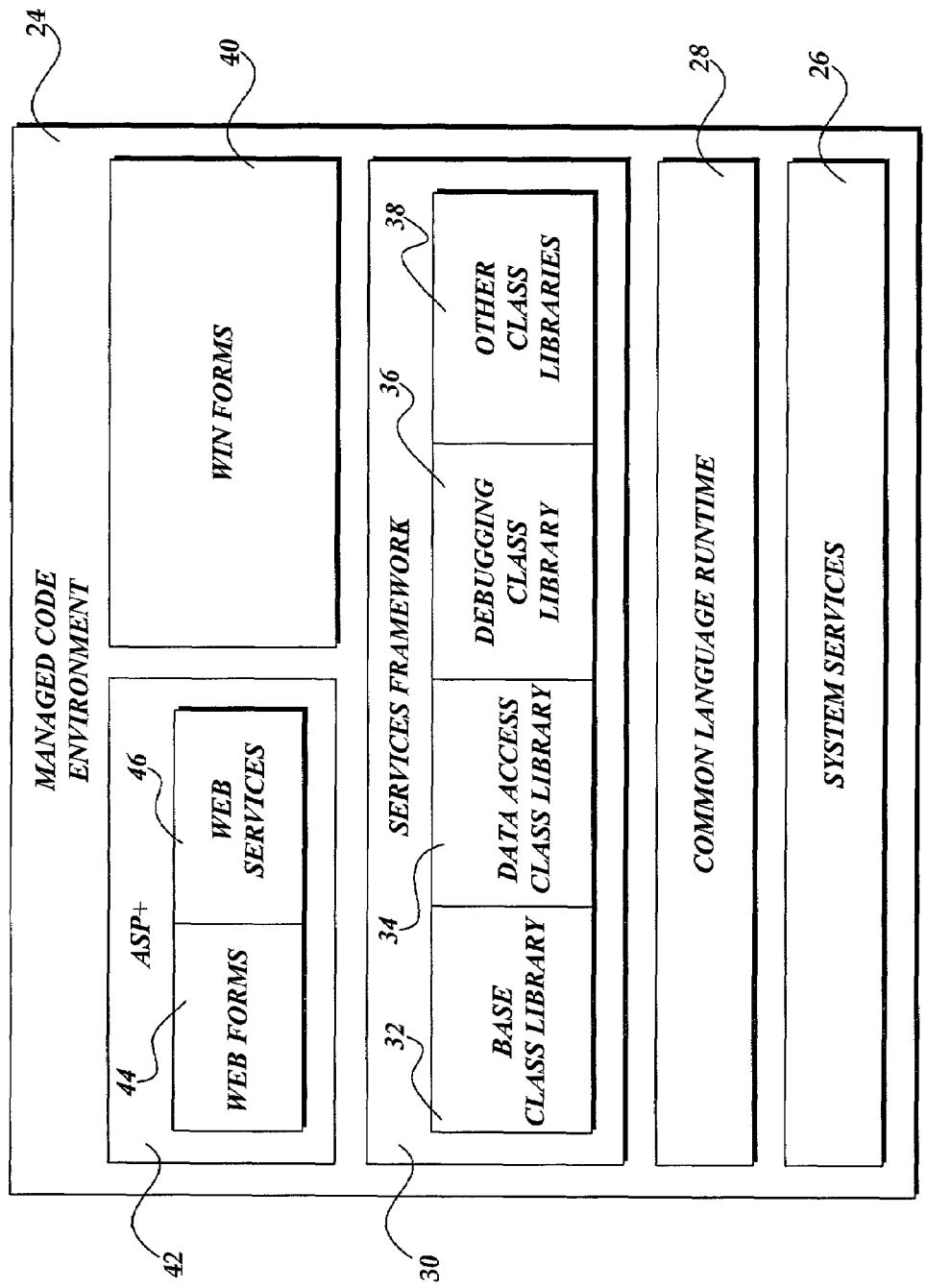
FIG. 2 is a block diagram showing a managed code environment, including a common language runtime, utilized in the actual embodiment of the present invention described herein.

Referring now to FIG. 2, an illustrative managed code environment 24 will be described. As mentioned briefly above, the managed code environment 24 comprises an application development and execution environment that provides facilities to make the development and execution of distributed applications and services much easier. In the actual embodiment of the present invention described herein, the managed code environment 24 comprises the Microsoft® .NET platform, which will be described in detail below. Those skilled in the art should appreciate that while the present invention is described herein as executing on the Microsoft® .NET framework, the present invention may also be utilized in connection with other types of managed code environments that utilize an interpreter, or "just-in-time" compiler to execute applications. For instance, the present invention may be utilized in connection with a Java® virtual machine from Sun Microsystems.

According to the actual embodiment of the present invention described herein, the managed code environment 24 comprises operating system services 26, a common language runtime 28, a services framework 30, and one or more application models, such as the active server pages plus ("ASP-.NET") application model 42 and the Win forms application model 40. Each of the components of the managed code environment 24 is described in detail below.

At the lowest level of the managed code environment 24 resides operating system services 26. As known to those skilled in the art, an operating system may provide a number of services such as memory management and hardware support through device drivers, and other types of services. These operating system services 26 are exposed to the managed code environment 24 through APIs, DLLs, or through other means known to those skilled in the art.

Built on top of the operating system services 26 is a common language runtime ("runtime") 28 that loads and executes code written in any runtime-aware programming language. Code that targets the runtime 28 is called managed code. Managed code means that there is a defined contract of operation between executing code and the runtime 28. Responsibility for tasks like creating objects, making method calls, and so on is delegated to the runtime 28, which enables the runtime 28 to provide additional services to the executing code.

The runtime 28 makes use of a common type system capable of expressing the semantics of most modern programming languages. The common type system defines a standard set of types and rules for creating new types. The runtime 28 understands how to create and execute these types. Compilers and interpreters use runtime 28 services to define types, manage objects, and make method calls instead of using tool- or language-specific methods.

A primary design goal for the type system of the runtime 28 is to enable deep multi-language integration. Using the runtime 28, code written in one language can inherit implementation from classes written in another language; exceptions can be thrown from code written in one language and caught by code written in another; and operations such as debugging and profiling work seamlessly regardless of the language used to write the code. This means that developers of reusable class libraries no longer need to create versions for each programming language or compiler, and developers using class libraries are no longer limited to libraries for the programming language they are using.

The runtime 28 also supplies integrated, pervasive security services to ensure that unauthorized users cannot access resources on a machine and that code cannot perform unauthorized actions. This improves overall system safety and reliability. Since the runtime 28 is used to load code, create objects, and make method calls, the runtime 28 can perform security checks and enforce security policy as managed code is loaded and executed. In this regard, the runtime 28 supports code access security and role-access security.

With code access security, developers can specify the required permissions their code requires. For example, code may need permission to write a file or access environment variables. At load time and on method calls, the runtime 28 verifies that the code can be granted the permissions it has asked for. If not, a security violation is reported.

Role-based security builds on the same permissions model as code access security, except that the permissions are based on user identity rather than code identity. Roles represent categories of users and can be defined at development or deployment time. Policies for granting permissions are assigned to each defined role. At run time, the identity of the user on whose behalf the code is running is determined. The runtime 28 determines what roles the user is a member of and then grants permissions based on those roles.

A services framework 30 resides on top of the runtime 28. The services framework 30 provides classes that can be called from any modern programming language. In particular, the services framework 30 includes a base class library 32, a data access class library 34, and a debugging class library 36. The base class library 32 includes a set of class libraries that developers would expect in a standard language library, such as collections, input/output, string, and numerical classes. In addition, the base class library 32 provides classes to access operating system services 26, such as graphics, networking, threading, globalization, and cryptography. The data access class library 34 provides classes for connecting to, issuing commands against, and retrieving results from data stores. Other class libraries 38 may also be provided. It should also be appreciated that each of these class libraries complies with a set of naming and design guidelines to further reduce the learning curve for developers.

Conceptually, on top of the services framework 30, sit two application models: the ASP.NET application model 42 and the Win forms application model 40. Developers writing client applications for the Microsoft Windows® operating system can use the Win forms application model 40 to take advantage of the rich user interface features of the Windows® operating system, including existing ActiveX controls and features of the Windows® 2000 operating system, such as transparent, layered, and floating windows.

The ASP.NET application model 42 takes advantage of the common language runtime 28 and the services framework 30 to provide a reliable, robust, scalable hosting environment for distributed applications. To provide such functionality, the ASP.NET application model 42 includes World Wide Web ("WWW" or "Web") forms 44 that are responsible for generating a user interface, typically in the form of hyper-text markup language ("HTML"). The ASP.NET application model 42 comes with a set of Web forms 44 that mirror typical HTML user interface widgets (including list boxes, text boxes, and buttons), and an additional set of Web controls that are more complex (such as calendars and advertising rotators). The ASP.NET application model also includes Web services 46 that provide a high-level programming model for building Web services with ASP.NET.

Figure 3:
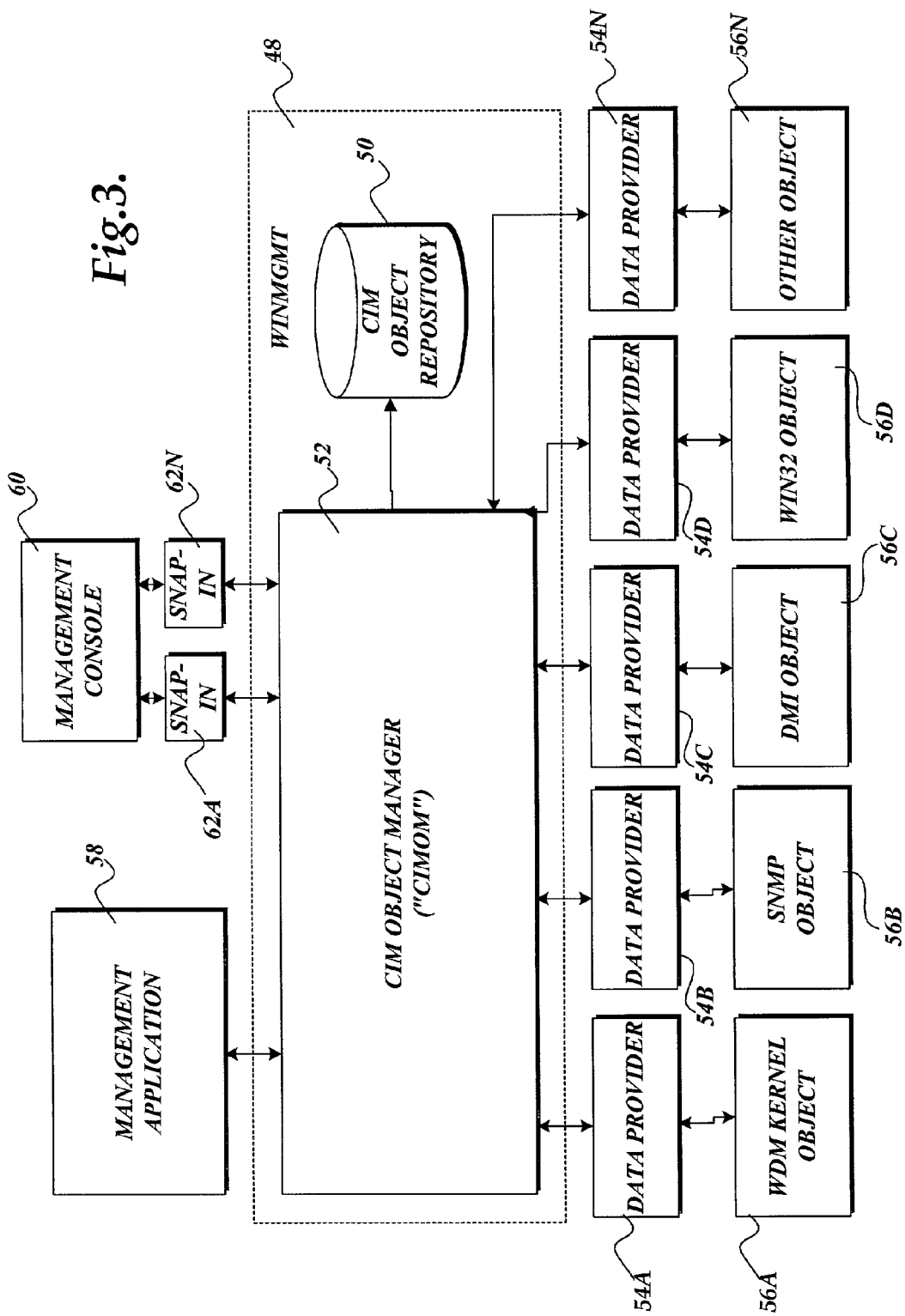
FIG. 3 is a block diagram showing an illustrative management instrumentation data source utilized in an actual embodiment of the present invention.

Referring now to FIG. 3, an illustrative management instrumentation data source will be described. As mentioned briefly above, aspects of the present invention provide an interface between a managed code runtime environment, such as the Microsoft® .NET platform, and a source of management instrumentation data. In the actual embodiment of the present invention described herein, the management instrumentation data source is Microsoft® Windows Management Instrumentation ("WMI").

As mentioned briefly above, WMI is the Microsoft Corporation's implementation of the Desktop Management Task Force's ("DMTF") Web-Based Enterprise Management ("WBEM") initiative. As known to those skilled in the art, WMI is a set of system services and programming interfaces that allow applications to expose instrumentation data in a consistent way. By exposing instrumentation data in a consistent fashion, management applications can be written to a single API.

WMI also provides a set of services, such as remoting, asynchronous access, and scripting, that allow applications and management tools to better access and serve management data without requiring information providers to explicitly support those features. It should be appreciated by those skilled in the art that while the actual embodiment of the present invention described herein provides an interface to data available through WMI, the present invention may also be practiced with other types of instrumentation data sources, including other implementations of WBEM.

In WMI, a service, WINMGMT 48, provides all of the WMI functionality. According to an actual embodiment of the present invention, the WINMGMT 48 service is implemented as a single executable process, in concert with several in-process DLLs that assist the executable process in areas such as delivering or filtering events. In accordance with another actual embodiment of the present invention, the WWMGMT 48 service is hosted in-process to another executable. This WINMGMT 48 service supports a Common Information Model ("CIM") object repository 50 that provides a central storage area for management data, a CIM object manager 52 ("CIMOM") that provides applications with uniform access to management data, and the APIs that together deliver WMI. Applications depend on the CIMOM 52 to handle the interface between a management application 58 and data providers 54A-54N. WMI facilitates these communications by supporting a common programming interface, the Component Object Model ("COM") interface. The WMI COM API supplies event notification and query processing services and can be used in several programming language environments, such as 'C' and 'C++'.

The CIM repository 50 holds the CIM and associated schema, along with data information or data source details. The CIMOM 52 uses the schema data contained in the CIM repository 50 when servicing requests from a management application 58 for data regarding managed objects 56A-56N. A management application 58 is an application or operating system service that uses or processes information originating from managed objects 56A-56N. A management application 58 can access managed object information by making a requests to the CIMOM 52 through one of the methods provided in the WMI API. As known to those skilled in the art, the CIMOM 52 may also use the schema data in the CIM repository 50 when servicing requests from a management console 60 received through "snap-ins" 62A-62N.

The managed objects 56A-56N are either physical or logical enterprise components that are modeled using CIM. For example, a managed object can be hardware such as a cable, or software such as a database application. Managed objects 56A-56N may include a Windows Driver Model ("WDM") kernel object 56A, a Simple Network Management Protocol ("SNMP") object 56B, a Desktop Management Interface ("DMI") object 56C, a WIN32 object 56D, or other type of object 56N.

The CIMOM 52 communicates with the managed objects 56A-56N through the data providers 54A-54N. The data providers 54A-54N are standard COM and distributed COM ("DCOM") servers that function as mediators between the managed objects 56A-56N and the CIMOM 52. The data providers 54A-54N supply instrumentation data for parts of the CIM schema. If the CIMOM 52 receives a request from a management application 58 for data that is not available from the CIM object repository 50, or for event notifications that are not supported by the CIMOM, the CIMOM 52 forwards the request to the appropriate one of the data providers 54A-54N. The data providers 54A-54N can then supply data and event notifications for the specific managed object 56A-56N to the CIMOM 52. In turn, this data can be returned by the CIMOM 52 to the management application 58. As will be described below, an API provided by the present invention also communicates with the CIMOM through a COM or DCOM interface.

Figure 4:
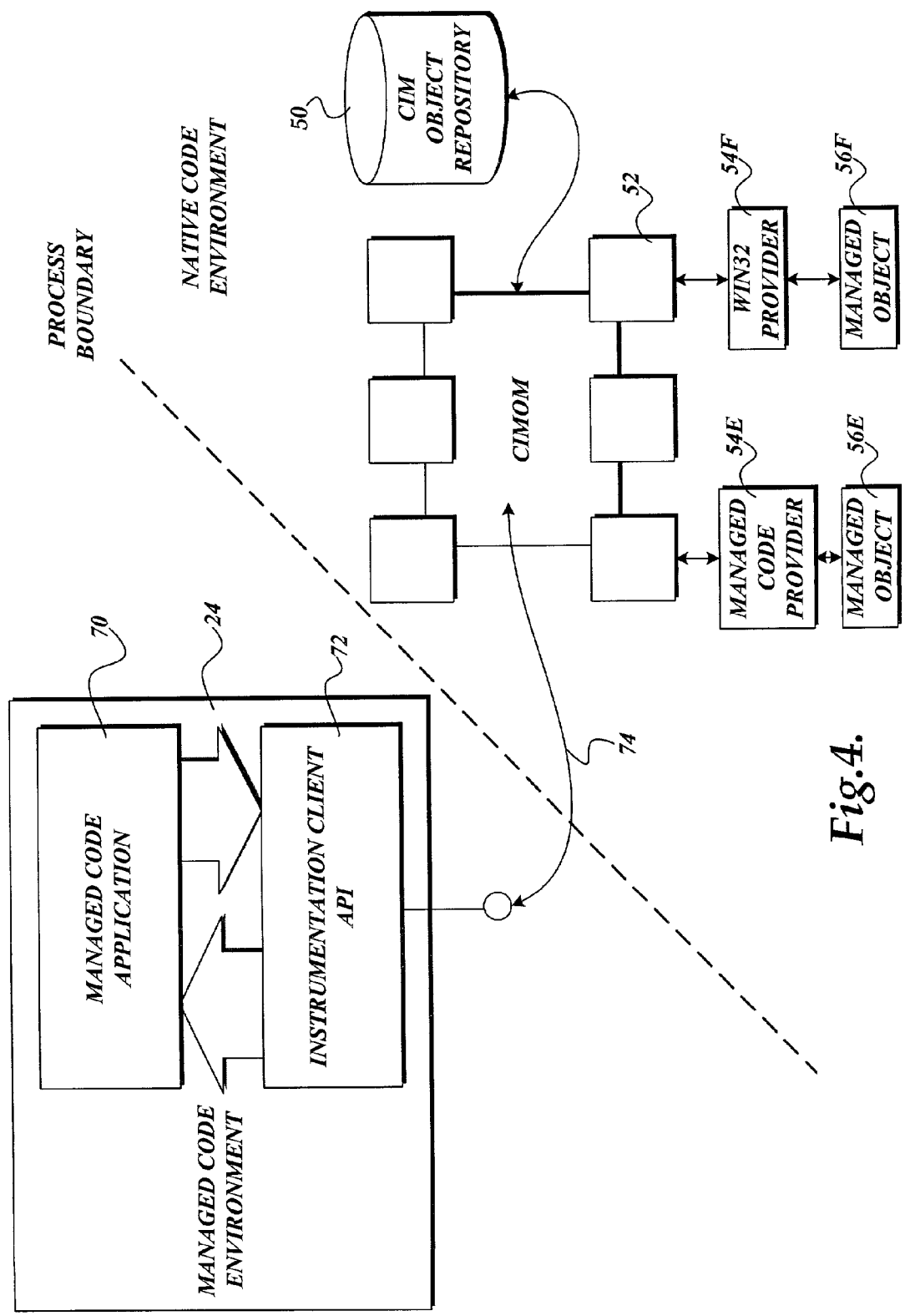
FIG. 4 is a block diagram showing an illustrative interface between a managed code environment and a management instrumentation data source executing within a native code environment.

Referring now to FIG. 4, an illustrative interface 74 between a managed code environment 24 and an instrumentation data source, such as WMI, executing within a native code environment will be described. As described above, an instrumentation data source, such as WMI, executes within a native code environment, such as WIN32. In WMI, the CIMOM 52 receives requests from management applications regarding managed objects, such as the managed objects 56E-56F, through a COM interface. In order to respond to such requests, the CIMOM 52 may query the CIM object repository 50, or may query a data provider associated with the particular managed object for which data is needed. For instance, the CIMOM 52 may query the WIN32 data provider 54F for instrumentation data regarding the managed object 56F. Likewise, the CIMOM 52 may query a data provider executing in managed code, such as the managed code provider 54E, for instrumentation data regarding the managed object 56E. Once the requested instrumentation data is received, the CIMOM 52 can respond to the request.

In order to provide access to instrumentation data to applications executing within the managed code environment 24, the present invention provides an instrumentation client API 72. As will be described in greater detail below, the instrumentation client API 72 defines a number of classes for facilitating communication with an instrumentation data source, such as WMI. These classes allow a managed code application 70 executing within a managed code environment 24 to request, receive, and modify instrumentation data from the instrumentation data source. Additionally, these classes provide access to instrumentation data from within the managed code environment 24 in a manner that is consistent with the models and classes provided by the managed code environment 24. Additional details regarding the objects and classes exposed by the instrumentation client API are described below with respect to FIGS. 5-9.

Figure 5:
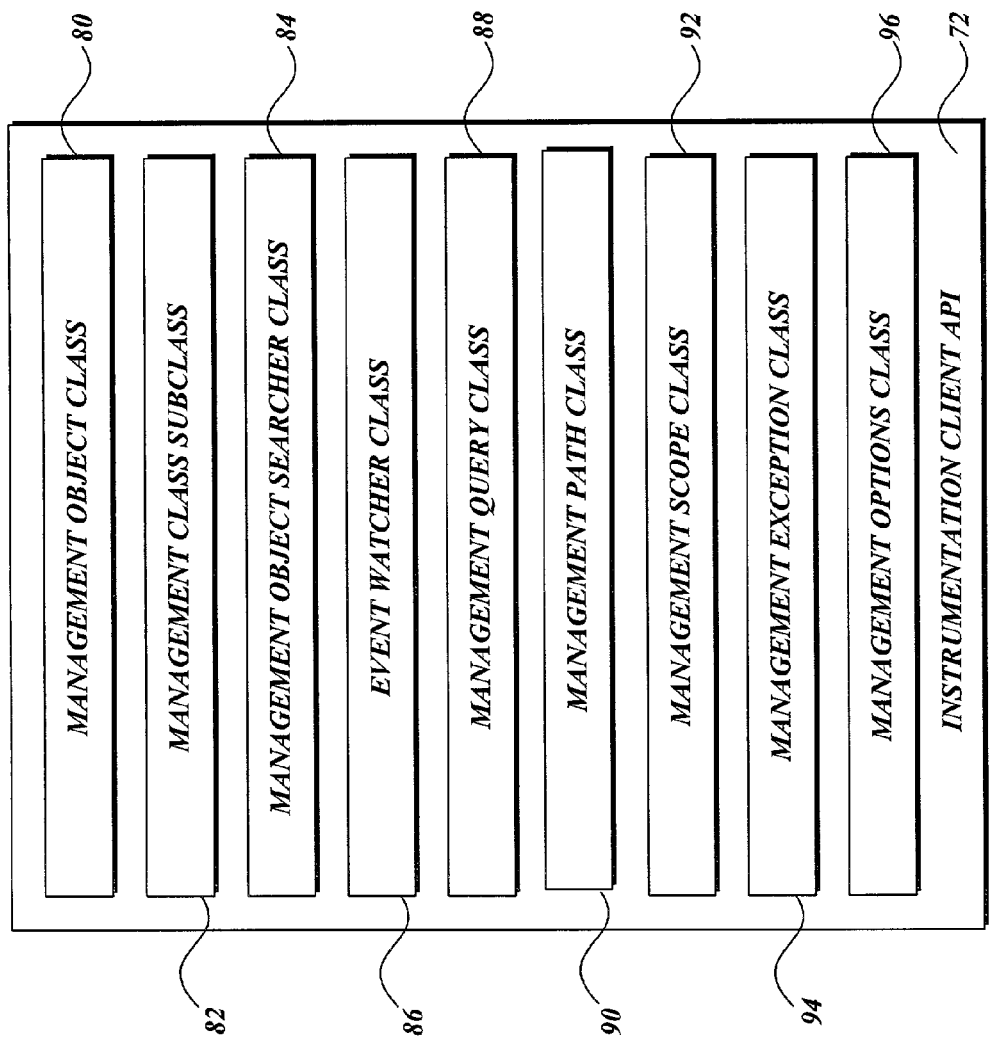
FIG. 5 is a block diagram showing an illustrative software architecture for an actual embodiment of the present invention.

Referring now to FIG. 5, an instrumentation client API 72 utilized in an actual embodiment of the present invention will be described. As discussed briefly above, the instrumentation client API 72 exposes a number of classes for interacting with a management instrumentation data source, such as WMI. As known to those skilled in the art, a class comprises the prototype for an object in an object-oriented programming language, such as C++, and is analogous to a derived type in a procedural language. A class may also be considered to be a set of objects which share a common structure and behavior. The structure of a class is determined by the class variables which represent the state of an object of that class and the behavior is given by a set of methods associated with the class.

More particularly, the instrumentation client API 72 exposes a management object class 80 and a management class subclass 82. The management object class 80 encapsulates a single non-transient instrumentation data object, such as a WMI object. The management object class 80 represents a management instrumentation data class or instance, but is not used to represent error or event objects. Instances of instrumentation data objects are represented using the management object class 80, and instances of instrumentation data classes are represented using the management class subclass 82. The management object class 80 and management class subclass 82 will be described in greater detail below with reference to FIGS. 6 and 7.

The instrumentation client API 72 also exposes a management object searcher class 84. The management object searcher class 84 is used to retrieve collections of management instrumentation data objects based on a specific query. The management object searcher class 84 permits data queries on instances of management instrumentation data objects for instance enumeration, WMI query language ("WQL") "select" queries, related objects queries, and relationships queries. Additionally, the management object searcher class 84 permits schema queries on management instrumentation data classes, such as class enumeration, WQL "select" queries, related classes queries, and relationship classes queries. A management query class 88 is also exposed to assist in the creation of queries. The management object searcher class 84 and the management query class 88 are described in greater detail below with reference to FIG. 8.

The instrumentation client API 72 also exposes a management event watcher class 86, a management path class 90, a management scope class 92, a management options class 96, and a management exception class 94. The management event watcher class 86 allows a management application to subscribe to temporary event notifications from the management instrumentation data source. The management path class 90 models a management instrumentation data source path to a scope or object. The management options class 96 is a base class for options classes for other components. The management options class 96 is not directly instantiable, but instances of derived classes are returned when events are raised. The management exception class 94 defines a wrapper for exceptions generated as a result of management instrumentation operations. This class cannot be instantiated directly; all management exceptions are thrown internally by this component. The management event watcher class 86, management path class 90, management scope class 92, management options class 96, and management exception class 94 are described in greater detail below with reference to FIGS. 6-9.

Figure 6:
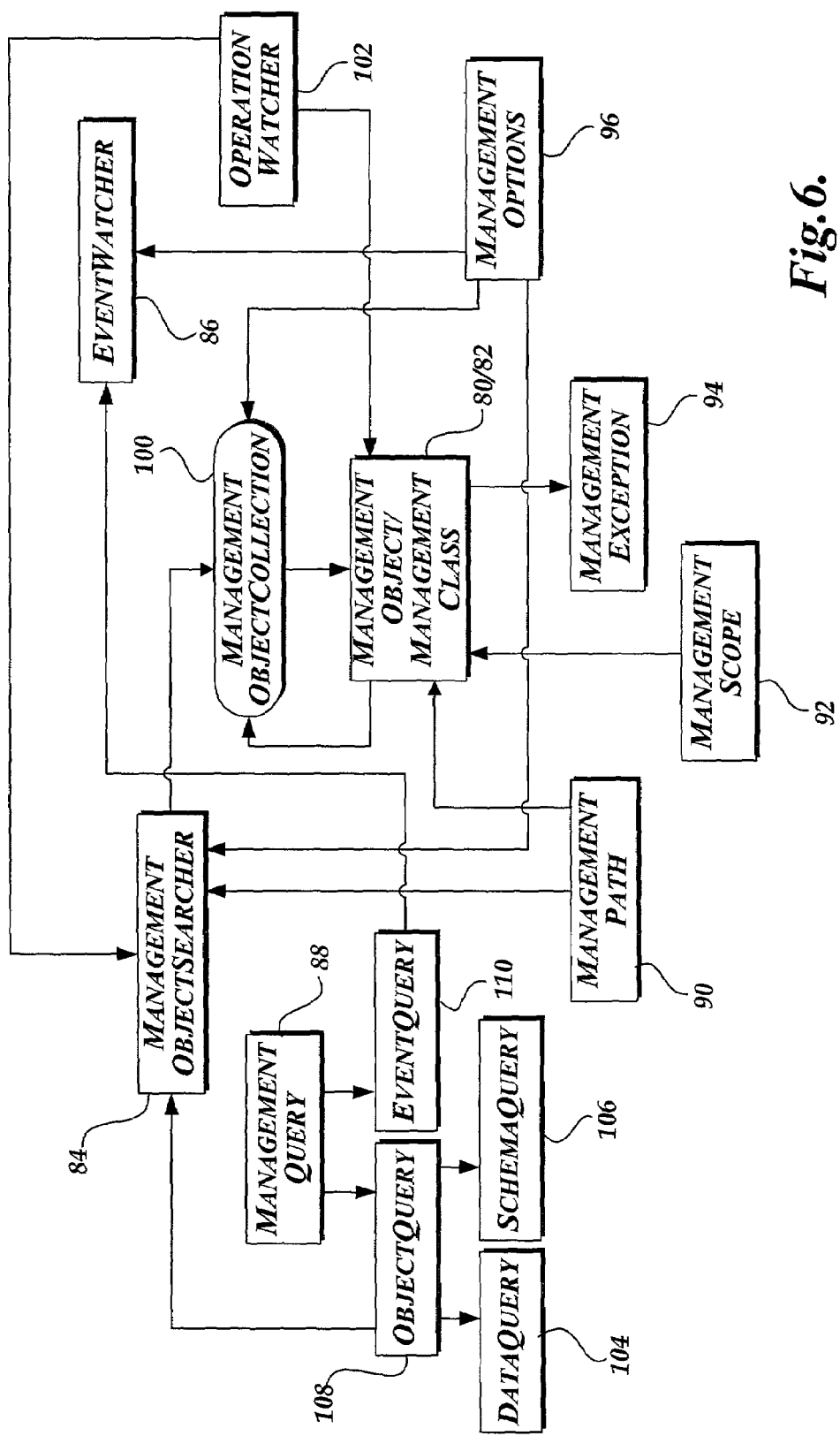
FIG. 6 is a block diagram showing software objects provided by an actual embodiment of the present invention and their relationships with one another.

Referring now to FIG. 6, the classes provided in an actual embodiment of the present invention, and their relationships to each other, will be described. As mentioned briefly above, the instrumentation client API provided by the present invention exposes a management object class 80 and a management class subclass 82. Instances of the management object class 80 are utilized to directly represent management instrumentation data objects. In order to represent management instrumentation data objects, the management object class 80 inherits from a base class that contains the properties, qualifiers, and other information describing management instrumentation objects. The management object class subclass 82 is utilized to access schema that describes management objects.

The management object class 80 defines a number of properties that control how the management object class 80 will be instantiated. In particular, the management object class 80 includes a management path property, a management options property, and a management scope property. The management path property describes the path to the instrumentation data object to which the instance of the instrumentation object class 80 will be, or has been, bound. Attempting to set this property after the object has been bound will result in an "invalid operation" exception being thrown. Attempting to set this property to a path that is not a valid instrumentation data class path or instance path will result in an "argument out of range" exception being thrown.

The management options property comprises the options used to retrieve the instrumentation data object. The management scope property defines the scope, or namespace, for a particular instance of the management options class 80. This includes the location of a parent object and options used to establish a connection to that scope. Attempting to set the management scope property after an instance of the management options class 80 has been bound to an instrumentation data object will result in an "invalid operation exception" being thrown.

In order to bind an instance of the management object class 80 to a particular management instrumentation object, such as a WMI object, three items of information must be provided: the path of the instrumentation data object to bind to; the options used to retrieve the instrumentation data object; and a scope, or namespace, identifying the parent of the instrumentation data object. These properties may be passed when calling the management object class 80 as instances of the management path class 90, management options class 96, or management scope class 92, respectively. Each of these classes is described in greater detail below. Alternatively, these items may be omitted and supplied subsequently by setting the management path, management options, or management scope properties on the created object, as shown by the code listing in Table 1. Defaults may also be utilized for these properties.

TABLE 1

ManagementObject o = new ManagementObject( );
o.Path = "Win32__Process='notepad.exe' ";

The management object class 80 also encapsulates a number of methods for performing operations on instances of the management object class 80. For instance, according to the actual embodiment of the invention described herein, the management object class 80 encapsulates a Get( ) method for binding the instance of the management object class 80 to the instrumentation object, a Put( ) method for saving changes made to the object or creating a new instrumentation object, a CopyTo( ) method for copying the object to another scope, a Delete( ) method for deleting the object, and an InvokeMethod( ) method for invoking a method provided by the management instrumentation data source, such as a method provided by WMI. Additional methods may also be encapsulated for performing other operations on instances of the management object class 80 as known to those skilled in the art.

The management object class 80 also encapsulates a GetRelated( ) method and a GetRelationships( ) method. The GetRelated( ) method provides functionality for retrieving a collection of objects related to the instance of the management object class 80. The GetRelationships( ) method returns a collection of objects that refer to the instance of the management object class 80. The GetRelated( ) and GetRelationships( ) methods return an instance of the management object collection class 100.

The management object collection class 100 represents a collection of instrumentation data objects. The management object collection class 100 is not directly instantiable, but is returned by certain methods called on instances of the management object class 80, management class subclass 82, as described above, and the management object searcher 84, described below. Each of the methods described above may be called directly on an instance of the management object class 80. Moreover, methods provided by the instrumentation data source can also be called directly on an instance of the management object class 80.

A management class subclass 82 is also provided in the actual embodiment of the present invention described herein. As mentioned briefly above, the management class subclass 82 provides functionality for accessing and representing a management instrumentation class, or schema. Instances of the management class subclass 82, therefore, represent instrumentation classes. This is in contrast to instances of the management object class 80 which represent actual instrumentation objects.

As with the management object class 80, three items of information must be passed in order to bind an instance of the management class subclass 82 to a particular management instrumentation class, such as a WMI class: the path of the instrumentation data class to bind to; the options used to retrieve the instrumentation data class; and a scope, or namespace identifying the parent of the instrumentation data class. These properties may be passed when calling the management class subclass 82 as instances of the management path class 90, management options class 96, or management scope class 92, respectively. Alternatively, these items may be omitted and supplied subsequently by setting the management path, management options, or management scope properties on the created object.

The management class subclass 82 also encapsulates several methods that providing functionality for dealing with instrumentation classes. For instance, a Get Instances( ) method is encapsulated that returns a collection of instances of the particular instrumentation class. Also, a GetSubclasses( ) method is encapsulated that returns the collections of subclasses of the particular instrumentation class.

The present invention also provides a management path class 90, a management scope class 92, and a management options class 96. The management path class 90 models a management instrumentation data source path to a scope or an object. So, for instance, the management path class 90 allows a path to an instance of the management object class 80 to be passed in, and returns the path to the associated instrumentation object. Additionally, the management path class 90 can accept a string as input and coerce the string into a proper management path. Furthermore, the management path class 90 provides functionality for receiving a complex string and returning the namespace containing the string, or the class name that the string represents.

The management scope class 92 provides functionality for building a management scope, or namespace. In general, an instance of the management scope class 92 needs two items of information to construct a management scope: the path of the instrumentation object to connect to; and the options used to bind to the scope. These items can be omitted and later supplied by setting appropriate properties on the corresponding object. The path can be supplied as an instance of the management path class 90, or as a simple string value representing a valid instrumentation path to a valid instrumentation namespace. If no path is supplied, a default path may be utilized.

The management options class 96 is a base class for a number of subclasses that allow options to be set that are utilized when certain operations are performed. For instance, a connection options subclass is provided that allows options to be set that are utilized when connecting to a management scope, and an enumeration options subclass is provided for setting options relating to the enumeration of objects, instances and subclasses. A query options subclass is also provided that sets options to be utilized when querying.

A management exception class 94 is also provided. The management exception class 94 defines a wrapper for exceptions generated as a result of instrumentation data source operations. Therefore, any of the methods described herein are capable of throwing exceptions corresponding to the management exception class 94 in the event of an error returned by the instrumentation data source. So, in an actual embodiment of the present invention utilizing WMI as the management instrumentation data source, a management exception will be thrown in response to the generation of HRESULTS by WMI. In this manner, exceptions are generated when error results are returned from the management instrumentation data source that are compatible with the managed code runtime environment.

An event watcher class 96 and an operation watcher class 102 are also provided according to the actual embodiment of the present invention described herein. The event watcher class 96 and operation watcher class 102 provide functionality for subscribing to temporary event notifications from the management instrumentation data source and to raise events concerning operations on other classes. The event watcher class 96 and the operation watcher class 102 are described in greater detail below with respect to FIG. 9.

A management object searcher class 84 and a management query class 88 are also provided. Generally described, the management object searcher class 84 provides functionality for retrieving collections of instrumentation data objects by enumeration or queries. The management query class 88 provides functionality for constructing instrumentation data queries. An object query subclass 108, an event query subclass 110, a data query subclass 104, and a schema query subclass 106 are also provided for constructing object queries, event queries, data queries, and schema queries, respectively. The management object searcher class 84 and the management query class 88 will be described in greater detail below with respect to FIG. 8.

According to the actual embodiment of the present invention described herein, each of the classes described above are defined using components. This allows these objects to be easily used in a visual development environment, such as Microsoft® Visual Studio. In such an environment, these objects may be utilized by "dragging" an empty object into the active window. The properties of the object will then be shown in a properties window and can be edited by the user. The code for the actual object is then generated based upon the visual representation.

According to the actual embodiment of the present invention described herein, an indexer is also provided for accessing the properties of instances of any of the classes described above by their name. Previously, it was necessary to call a method to obtain properties of a management instrumentation object. However, through the use of the indexer, the properties of an object may be accessed in an array-like fashion by simply referencing the name of the desired property against a particular object.

Figure 7:
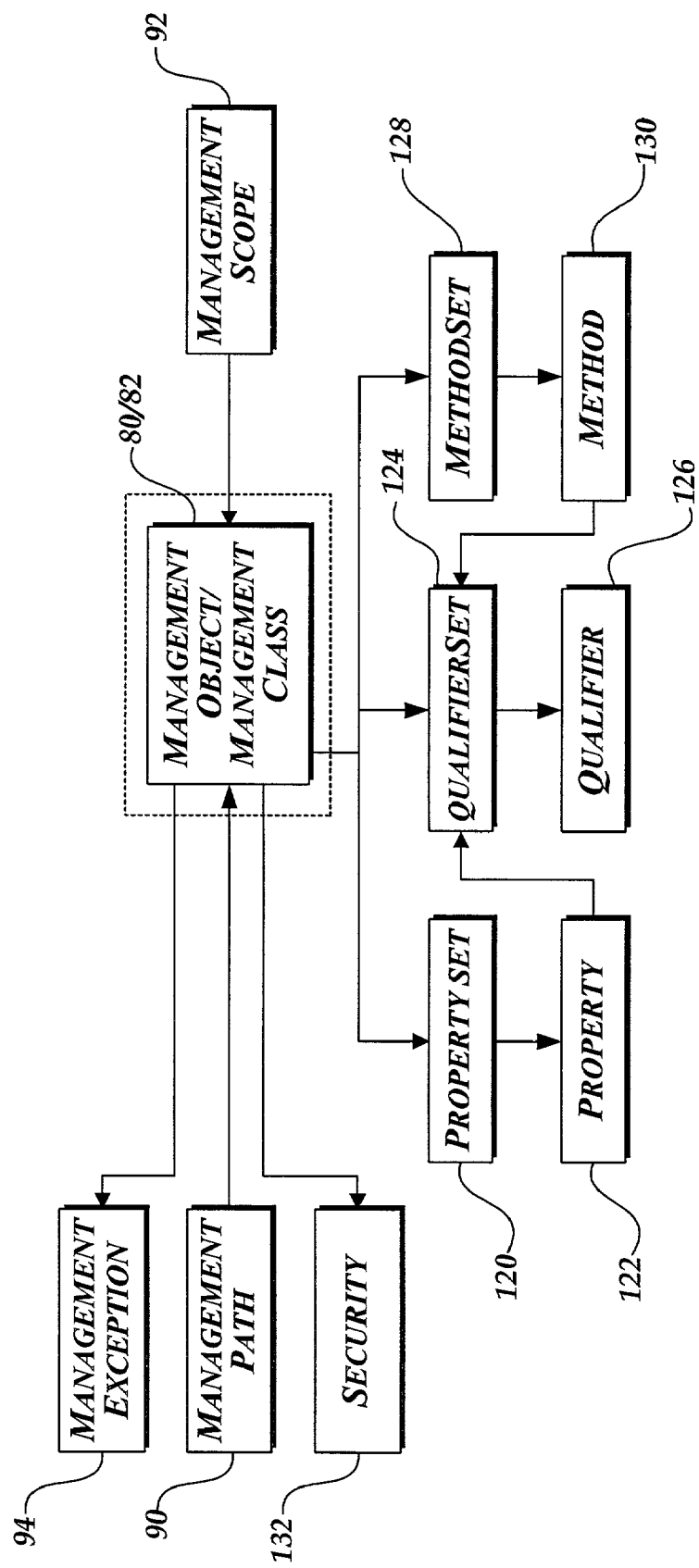
FIG. 7 is a block diagram showing an illustrative management object class and management class subclass provided by an actual embodiment of the present invention and their relationships to other objects.

Referring now to FIG. 7, additional aspects of the management object class 80 and management class subclass 82 provided in an actual embodiment of the present invention will be described. As shown in FIG. 7, the present invention provides several classes for accessing the properties, qualifiers, and methods of an instance of the management object class 80 and the management class subclass 82. In particular, a property set class 120 and property class 122, a qualifier set class 124 and qualifier class 126, and a method set class 128 and method class 130 are provided.

The property set class 120 represents a collection of management instrumentation properties for an instrumentation object or class. The property set class 120 is not directly instantiable, but is returned when a request is made for the properties of a management object. Similarly, the qualifier set class 124 and the method set class 128 represent collections of qualifiers and methods, respectively, for an instrumentation object or class. These classes are also not directly instantiable, but are returned when a request is made for the qualifiers or methods of an instrumentation object.

The property class 122, qualifier class 126, and method class 130 represent a single instrumentation object property, qualifier, or method, respectively. These classes are also not directly instantiable, but can be obtained from instances of the property set class 120, qualifier set class 124, and method set class 128, respectively. For instance, the code shown in Table 2 creates a new instance of the management object class 80, binds the instance to the Win32 service object 'Alerter', and enumerates the properties of the object.

TABLE 2

```
ManagementObject myservice = new
ManagementObject("Win32_Service='Alerter' ");
foreach (Property p in myservice.Properties)
    Console.WriteLine (p.Name, p.value);
```

Figure 8:
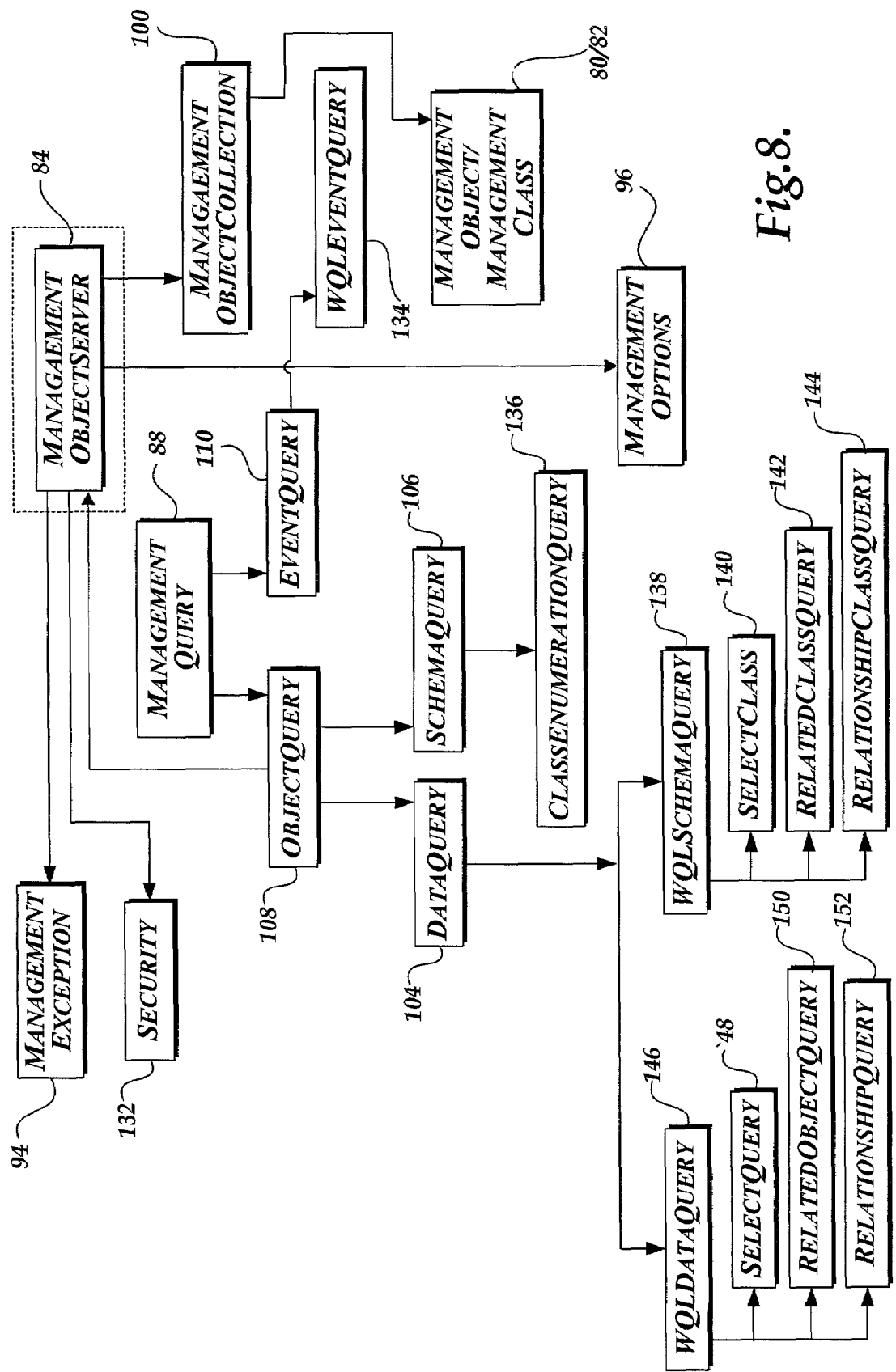
FIG. 8 is a block diagram showing an illustrative management object searcher class provided by an actual embodiment of the present invention and its relationship to other objects.

Turning now to FIG. 8, object classes provided by the present invention for discovering other management instrumentation objects will be described. According to the actual embodiment of the present invention described herein, a management object searcher class 84 is provided. The management object searcher class 84 provides functionality for retrieving collections of instrumentation objects from the instrumentation data source by enumeration or queries.

The management object searcher class 84 is directly instantiable and needs three items of information to be constructed: the path of the instrumentation scope for the search; the query that is the basis for the search; and the options used to perform the search. The scope can be supplied using the management scope class 92, described above. The options can be provided using the management options class 96. The query can be provided as a simple string or as an instance of the data query class 104, described below. Any of these items can be omitted and later supplied using the corresponding properties on the object.

The management object searcher class 84 also encapsulates a Get( ) method which initiates the retrieval of objects satisfying the search criteria set up on the search object. The Get( ) method executes the specified query and returns a collection of the resulting objects. For instance, the code shown in Table 3 creates a new instance of the management object searcher class 84, performs a query on the object, and returns a collection containing the results. If error results are returned from the management instrumentation data source, a management exception will be thrown.

TABLE 3

```
ManagementObjectSearcher s =new
ManagementObjectSearcher( );
s.scope = "root\cimv2";
s.query = new SelectQuery("select * from
Win32_LogicalDisk");
disks = s.Get( )
foreach (disk in disks)
```

The management query class 88 provides functionality for modeling queries of instrumentation objects, classes, and events. In particular, the management query class 88 encapsulates an object query subclass 108 and an event query subclass 110. The event query subclass 110 can model event queries using the WQL event query subclass 134. The query can then be utilized by the event watcher object 86 described below with respect to FIG. 9. The object query subclass 108 further encapsulates a data query subclass 104 and a schema query subclass 106. The schema query subclass 106 provides functionality for modeling schema queries. For instance, class enumeration subclass 136 may be provided for modeling class enumeration queries. Other types of schema queries may also be modeled.

The data query subclass 104 provides functionality for modeling WQL queries to objects or classes. To provide this functionality, the data query class 104 encapsulates the WQL data query subclass 146 and the WQL schema query subclass 138. The WQL data query subclass 146 provides functionality for modeling a WQL query based upon an input query string. In particular, the WQL data query subclass 146 encapsulates a select query subclass 148, a related object query subclass 150, and a relationships query subclass 152. The select query subclass 148 provides functionality for modeling a select query, such as a WQL "SELECT" query. The related objects query subclass 150 provides functionality for modeling an associators query, such as a WQL "ASSOCIATORS OF" query. The relationships query subclass 152 provides functionality for modeling a references query, such as a WQL "REFERENCES TO" query. The WQL schema query subclass 138 provides corresponding functionality for modeling WQL schema queries through the select class subclass 140, the related class query subclass 142, and the relationship class query subclass 144. Table 4 shows the use of a "SELECT" query to find all environment variables for a particular user.

TABLE 4

```
SelectQuery q = new SelectQuery("Win32_Environment",
    "UserName = <SYSTEM>");
ManagementObjectSearcher s = new
ManagementObjectSearcher (q);
foreach (ManagementObject o in s.Get( ))
    Console.WriteLine (o["Name"],
o["VariableValue"]);
```

Figure 9:
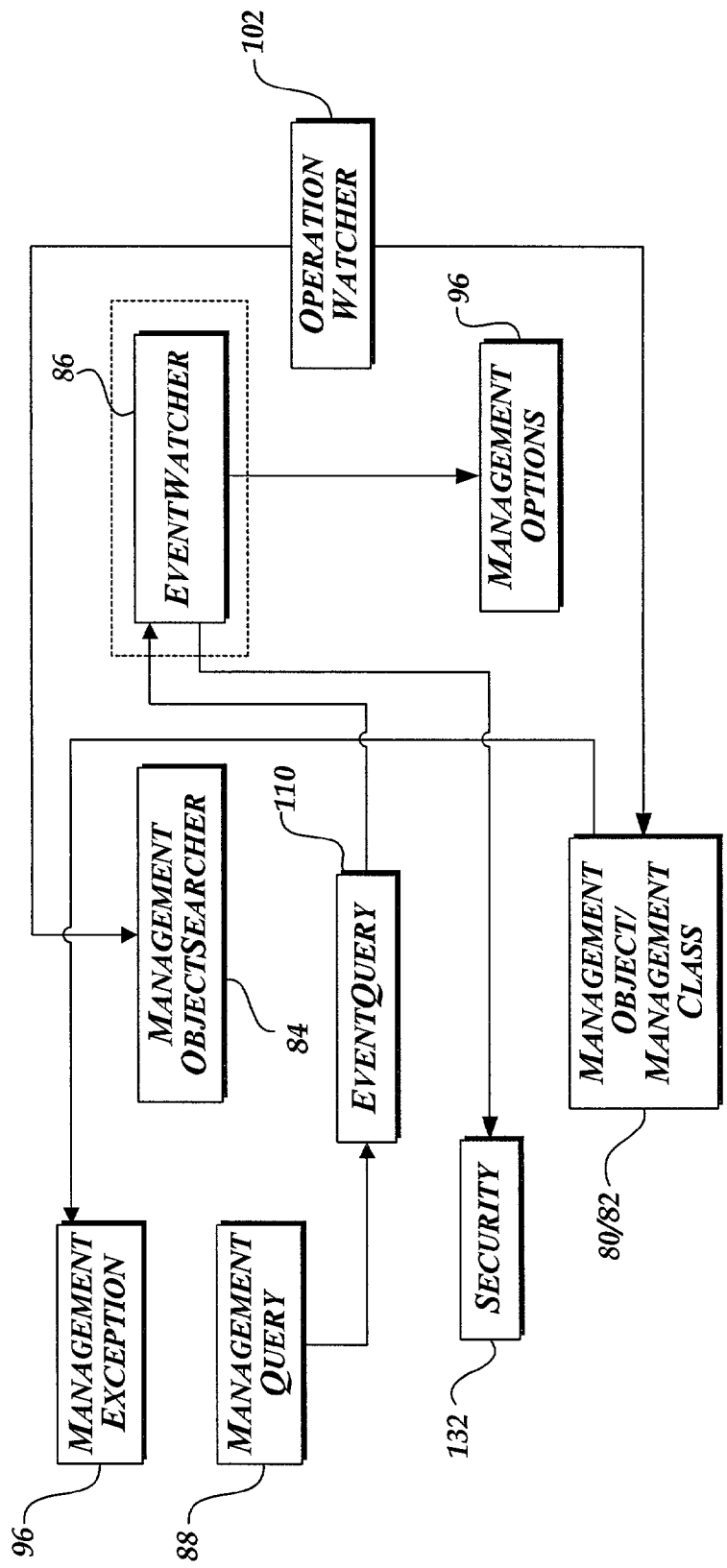
FIG. 9 is a block diagram showing an illustrative management object searcher class and management event watcher class provided by an actual embodiment of the present invention and their relationships to other objects.

Referring now to FIG. 9, aspects of the present invention for subscribing to and receiving event notifications will be described. According to the actual embodiment of the present invention described herein, an event watcher class 86 is provided. The event watcher class 86 provides functionality for subscribing to temporary event notifications from the instrumentation data source.

In order to construct a valid instance of the event watcher class 86, three items of information are needed: the scope for the watch; the event query that is the basis for the watch; and the options used to perform the query. The scope may be supplied as an instance of the management scope class 92 or as a simple string value. The query can be supplied as a simple string, or as an instance of the event query class 110 described above. Each of these items may be omitted and later supplied by setting the appropriate property on the event watcher object.

The event watcher class 86 also encapsulates several methods that provide functionality for synchronous and asynchronous event watching. In particular, the event watcher class 86 encapsulates a WaitForNextEvent( ) method that provides functionality for waiting for the next event. In this manner, an instance of the event watcher class 86 is created that blocks until an event matching the supplied query occurs. When an event matching the query occurs, the WaitForNextEvent( ) returns the event. In this manner, syncronous event watching is provided.

The event watcher class 86 also encapsulates Start( ) and Stop( ) methods for providing asynchronous event watching. In particular, the Start( ) method instructs the object to begin listening for events. The caller may attach a handler to an EventArrived event of the object to receive the events. The object does not block while listening for events. The Stop( ) method is utilized to instruct the object to stop listening for events. This includes any currently running synchronous or asynchronous query which is active for the object. In this manner, asynchronous event notifications may be received.

In light of the above, it should be appreciated by those skilled in the art that the present invention provides a method and apparatus for providing access to computer systems management instrumentation data from within a managed code environment. While an actual embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for providing access to instrumentation data from within a managed code runtime environment, wherein the data arises from a source outside the managed code runtime environment, the method comprising:
   providing an application compiled into an intermediate form from a runtime-aware programming language, the application being suitable for execution by a runtime engine in a managed code runtime environment;
   executing the application in the managed code runtime environment;
   receiving a request at the runtime engine from the executing application for instrumentation data from a source executing in a native code environment outside the managed code runtime environment;
   the runtime engine binding an instance of a management object class to a particular management instrumentation object, the instance of the management object class being constructed from an API comprising the management object class, the management object class encapsulating a method for binding an instance of the management object to the particular management instrumentation object and a method for saving changes made to the object,
   the API further comprising a management object searcher class which permits the retrieval of a collection of instrumentation objects based on a specified query, a management event watcher class, a management path class, a management scope class providing functionally for building a management scope or namespace, and a management options class which is a base class for subclasses that allow options to be set that are utilized when certain operations are performed, the certain operations comprising one or more of connecting to a management scope, enumeration of object, and querying,
   the particular management instrumentation object representing the data source executing in the native code environment outside management code environment;
   wherein binding the instance comprises passing a path of an instrumentation data object for the instance of the management object to bind to, options used to retrieve the instrumentation data object, and a namespace identifying a parent of the instrumentation data object;
   transmitting a corresponding request for said instrumentation data to the source executing in the native code environment outside the managed code runtime environment;
   receiving a response to said corresponding request from said instrumentation data source; converting said response to a format that is compatible with said managed code runtime environment; and
   responding to said request for instrumentation data with said converted response.

2. The method of claim 1, wherein converting said response comprises converting the instrumentation data object to a management object that is compatible with said managed code runtime environment.

3. The method of claim 2, wherein said response comprises an indication that an operation was unsuccessful and wherein converting said response to said format comprises generating a management exception object.

4. The method of claim of 3, wherein said indication that an operation was unsuccessful comprises at least one error code.

5. A computer-readable storage medium comprising instruction which, when executed by computer, cause the computer to perform the method of claim 1.

6. A computer-controlled apparatus comprising a processing unit and a system memory, and wherein the apparatus further comprises a managed code runtime environment and is configured to carry out the method of claim 1.

7. A computer-implemented method for accessing instrumentation data from within a managed code runtime environment, wherein the managed code runtime environment provides a runtime engine that executes an application compiled from source written in a runtime-aware language into an intermediate form, the method comprising:
   receiving a request from an application compiled from source written in a runtime-aware language into an intermediate form for instrumentation data representing management information about other application and devices available in an environment outside the managed code runtime environment, the outside environment comprising a native code environment,
   wherein the request for said instrumentation data from said outside environment is implemented within a runtime engine of said managed code runtime environment using an API for binding an instance of a management object class to a particular instrumentation data object, the instance of the management object class being constructed from the API and encapsulating a method for binding an instance of the management object to the particular instrumentation data object and a method for saving changes made to the object, the instrumentation data object representing the data source executing in the native code environment outside the managed code runtime environment,
   wherein binding the management class instance to the instrumentation data object comprises passing the path of the instrumentation data to bind to, the option used to retrieve the instrumentation data object, and a namespace identifying the parent of the instrumentation data object;

wherein the API comprises a management object class which encapsulates a method for binding an instance of the management object to the instrumentation object and a method for saving changes made to the object, a management object searcher class which permits the retrieval of a collection of instrumentation object based on a specified query, a management event watcher class, a management path class, a management scope class providing functionally for building a management scope or namespace, and a management options class which is a base class for subclasses that allow options to be set that are utilized when certain operations are performed, the certain operations comprising one or more of connecting to a management scope, enumeration of objects, and querying;

converting a response to a format that is compatible with the managed code runtime environment; and responding to the request for instrumentation data with the converted response.

8. The method of claim 7, further comprising: binding the instance of the management object class to said instrumentation data object for accessing said instrumentation data.

9. The method of claim 8, further comprises constructing a management path object identifying the path to said instrumentation data object.

10. The method of claim 8, further comprising constructing a management options object specifying one or more options to retrieve said instrumentation data object for accessing said instrumentation data.

11. The method of claim 8, further comprising: throwing a management exception object in response to determining that said instrumentation data was not successfully returned.

12. The method of claim 8, wherein properties of said management object may be accessed utilizing an indexer.

13. A computer-readable storage medium comprising instructions which, when executed by a computer, cause the computer to perform the method of claim 7.

14. A computer-controlled apparatus comprising a processing unit and a system memory, and wherein the apparatus further includes a managed code runtime environment and is configured to carry out the method of claim 7.

* * * * *